US005620516A

United States Patent [19]

Helsing et al.

[11] Patent Number: 5,620,516

[45] Date of Patent: *Apr. 15, 1997

[54] WOOD-TREATING DEVICE

[75] Inventors: Guy G. Helsing, Albany; Jon Atherton, Hillsboro, both of Oreg.

[73] Assignee: National Wood Treating Company, Corvallis, Oreg.

[ * ] Notice: The term of this patent shall not extend beyond the expiration date of Pat. No. 5,443,641.

[21] Appl. No.: 392,139

[22] Filed: Feb. 22, 1995

Related U.S. Application Data

[63] Continuation of Ser. No. 51,042, Apr. 21, 1993, Pat. No. 5,443,641.

[51] Int. Cl.[6] .................... A01G 29/00

[52] U.S. Cl. .................... 118/407; 118/408; 427/440; 47/48.5; 47/57.5; 47/1.5

[58] Field of Search .................... 118/407, 410, 118/408, 35, 254, 506; 427/440, 254; 47/48.5, 57.5, 1.5; 220/366.1, 359; 215/228, 250, 297, 302, 307, 310

[56] References Cited

U.S. PATENT DOCUMENTS

| | | | |
|---|---|---|---|
| 231,784 | 8/1880 | Flad | 427/440 |
| 1,312,634 | 8/1919 | Kruse | 427/440 |
| 1,999,458 | 4/1935 | Hollister | 47/57.5 |
| 2,970,404 | 2/1961 | Beaufils et al. | 47/57.5 |
| 3,077,166 | 2/1963 | Delp | 47/57.5 X |
| 3,290,822 | 12/1966 | Mauget | 47/57.5 |
| 3,295,254 | 1/1967 | Schoonman | 47/57.5 |
| 3,367,065 | 2/1968 | Du Val Cravens | 47/57.5 |
| 3,691,683 | 9/1972 | Sterzik | 47/57.5 |
| 3,916,564 | 11/1975 | Crowell | 47/48.5 |
| 3,946,871 | 3/1976 | Sturm | 220/359 |
| 4,000,816 | 1/1977 | Spruyt | 220/359 X |
| 4,103,456 | 8/1978 | Hendrixson et al. | 47/57.5 |
| 4,308,689 | 1/1982 | Jenson et al. | 47/57.5 |
| 4,344,250 | 8/1982 | Fahlstrom | 47/57.5 |
| 4,448,345 | 5/1984 | Helms | 220/359 X |
| 4,719,133 | 1/1988 | Woudsma | 427/440 |
| 4,724,793 | 2/1988 | Sletten | 118/35 |
| 4,866,880 | 9/1989 | Weinblatt | 47/79 |
| 4,896,454 | 1/1990 | Cronenwett et al. | 47/57.5 |
| 4,989,366 | 2/1991 | DeVlieger | 47/57.5 |
| 4,995,190 | 2/1991 | Royer | 47/1.01 |
| 5,010,684 | 4/1991 | Merving | 47/57.5 |
| 5,207,021 | 5/1993 | Merving | 47/57.5 |
| 5,235,149 | 8/1993 | Boehrer | 220/359 |
| 5,239,773 | 8/1993 | Doolittle | 47/57.5 |
| 5,443,641 | 8/1995 | Helsing et al. | 118/407 |

FOREIGN PATENT DOCUMENTS 891350 12/1943 France .

*Primary Examiner*—Harold Pyon
*Attorney, Agent, or Firm*—Klarquist Sparkman Campbell Leigh & Whinston, LLP

[57] ABSTRACT

A docking sleeve is provided for insertion into a bore in the side of a work-piece. A sealed chemical-holding cylinder is passed through the docking sleeve into the bore and an actuator is screwed into the docking sleeve to pierce a seal of a the cylinder so that chemicals contained therein can vaporize and treat the inside of the work-piece.

18 Claims, 2 Drawing Sheets

WOOD-TREATING DEVICE

This application is a continuation of application Ser. No. 08/051,042, filed Apr. 21, 1993, and now U.S. Pat. No. 5,443,641, issued on Aug. 22, 1995.

TECHNICAL FIELD

This invention relates to a system and method for treating wood and more particularly for providing chemicals internally thereto.

BACKGROUND INFORMATION

Wood products such as utility poles for electric and telephone transmission wires, piling supports for highway and railroad bridges, pier timbers, and wood building structural components are all subject to attack by wood-destroying fungi and insects.

One method of combating such destruction is by the internal application of fumigants including chemical agents which are toxic to the wood destroying organisms. Unfortunately, most effective chemical agents are usually not only toxic to destructive organisms, but also to human beings, animals and the environment. For example, the toxic chemical treatment agents are particularly hazardous to the wood-treating personnel who must handle the fumigants. As a result, wood-treating personnel must wear cumbersome and unreliable face shielding and goggles or, in some instances, full face respirators when applying the toxic chemicals to the wood products. Additionally, environmental contamination may occur if the toxic fumigants seep or spill into the environment.

There are several known methods and devices used to internally treat wood products with fumigants. Fumigants containing chemical agents are often liquid and applied by pouring the fumigants into pre-drilled bores and then plugging the bores to prevent the fumigants from escaping therefrom. For example, U.S. Pat. No. 4,989,366, describes an external cylinder containing toxic chemicals which flow into a pre-drilled bore by first piercing a seal.

This device may expose the personnel handling the fumigants to toxic vapors and environmentally damaging chemicals may spill onto the ground. Additionally, seasoning check and knots in the treated wood product may cause leakage of fumigants into the environment.

Other methods of treating wood include peeling off a seal of a chemical-containing capsule to allow chemical vapors to slowly escape from the capsule. The unsealed capsule is then dropped into a pre-drilled bore in the wood product to be treated and the bore is plugged with a wooden peg to seal in the vapors. Using this method, the working personnel again are exposed to toxic vapors when the capsule is dropped into the pre-drilled opening and vapors may leak around and through the wood peg.

Therefore, there is a need for a wood-treating system for safe and effective treatment of wood products without environmentally damaging spillage and dangerous exposure of toxic chemical agents to the personnel handling the wood-treating device.

DETAILED DESCRIPTION OF THE INVENTION

Figures 1, 2, 3:
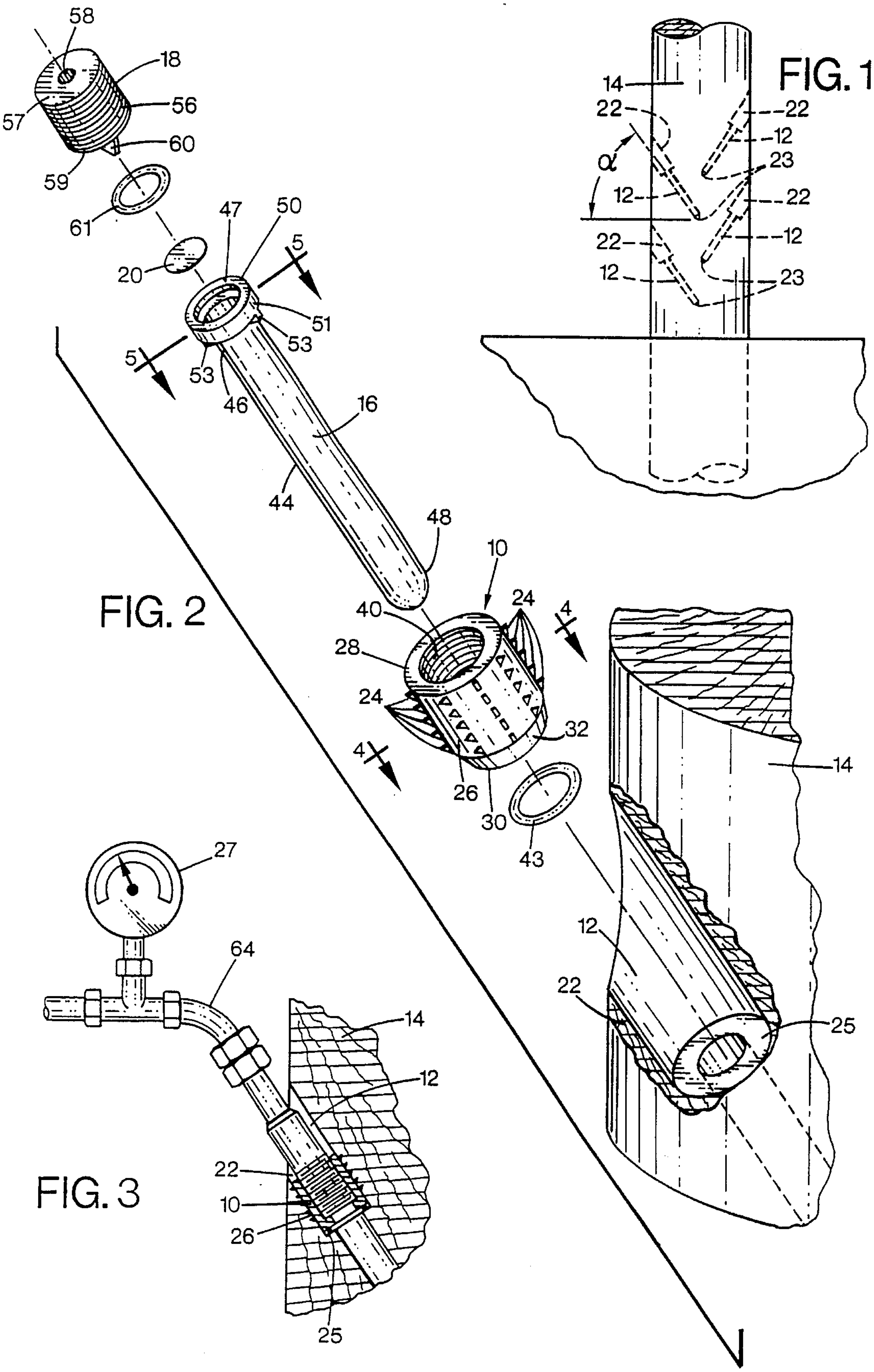
FIG. 1 is a side elevational view of a portion of a utility pole including pre-drilled bores.
FIG. 2 is an exploded view of an embodiment of a device according to the present invention positioned for insertion into a bore in a work-piece.
FIG. 3 is a side view of a vacuum/pressure tester connected to a pre-drilled hole according to the invention.
Figure 4:
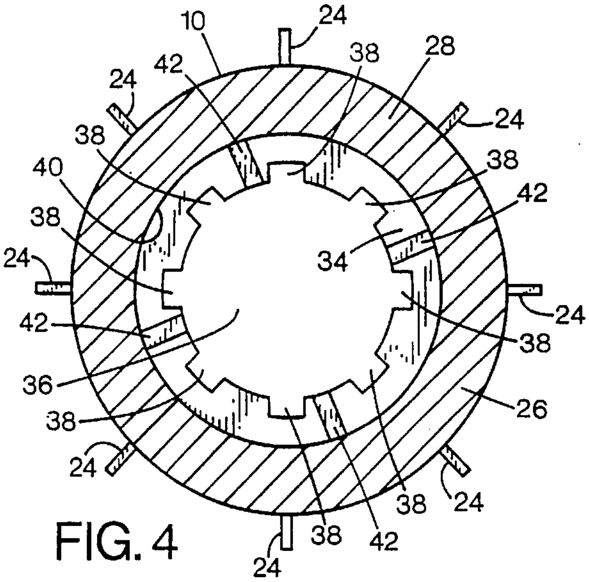
FIG. 4 is an enlarged cross-sectional view taken along lines 4—4 in FIG. 2.
Figure 5:
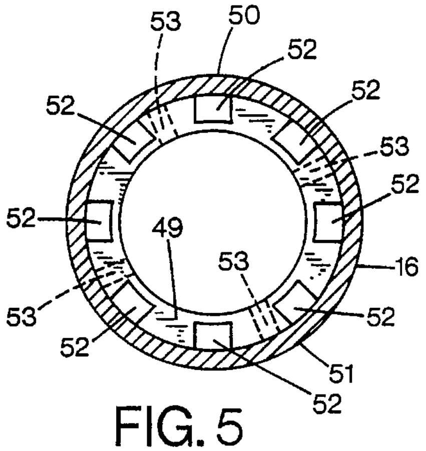
FIG. 5 is an enlarged cross-sectional view taken along lines 5—5 in FIG. 2.

With reference to FIGS. 1–7, a preferred embodiment of the present invention is illustrated wherein a docking sleeve 10 is provided for insertion into a pre-drilled bore 12 in the side of a work-piece, such as a utility pole 14. A sealed, rechargeable, chemical-holding container, or cylinder, 16 is passed through the docking sleeve into the bore in the work-piece and an actuator 18 is screwed into docking sleeve 10 to pierce a seal 20 of the cylinder so that chemicals contained therein can vaporize and treat the inside of the work-piece.

Utility pole 14 is prepared for chemical treatment by first drilling one or more downwardly inclined bores 12 into the pole. Preferably, the bores are drilled at angle $\alpha$ of about 55° with respect to a horizontal plane (best shown in FIG. 1). The bores can be provided in a spiral pattern around the pole from ground level up to about four feet or higher. As will become apparent, it is important to avoid drilling the bores into seasoning checks and knots because they tend to leak once fumigants have been applied therein. The application of fumigants into the pre-drilled bores is explained in greater detail below.

In a preferred embodiment, each bore 12 has a diameter through a major portion of its length of less than 1 inch and a depth of about 10 inches. Bore 12 has an outer end portion 22 and a closed inner end 23. Outer end portion 22 of bore 12 is counter-bored approximately two inches deep to increase the diameter to about 1½ inches with a counter-bore bottom lip 25. It is to be understood that the dimensions of the bores may vary and that a bore which is not counter-bored can be used. Additionally, the bores are preferably, but no necessarily, downwardly inclined and positioned above ground.

Figure 6:
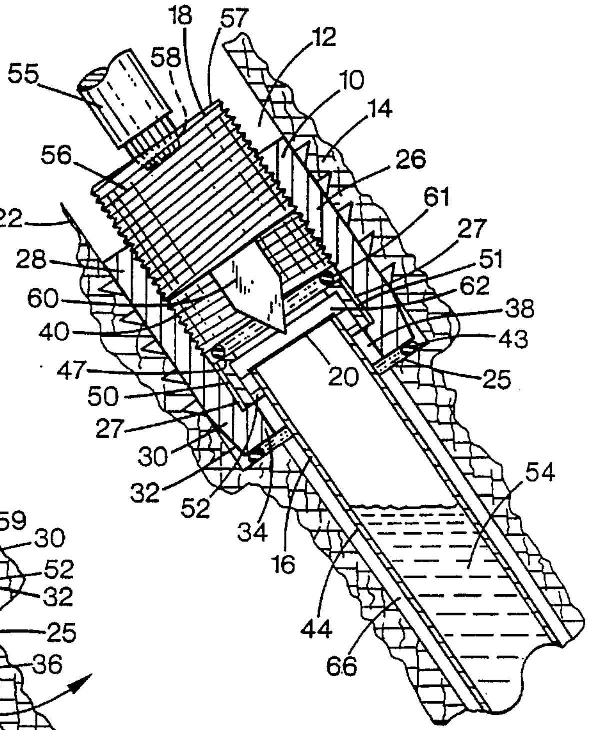
FIG. 6 is a cross-sectional view of the device of FIG. 2, inserted in a bore prepared for operation.
Figure 7:
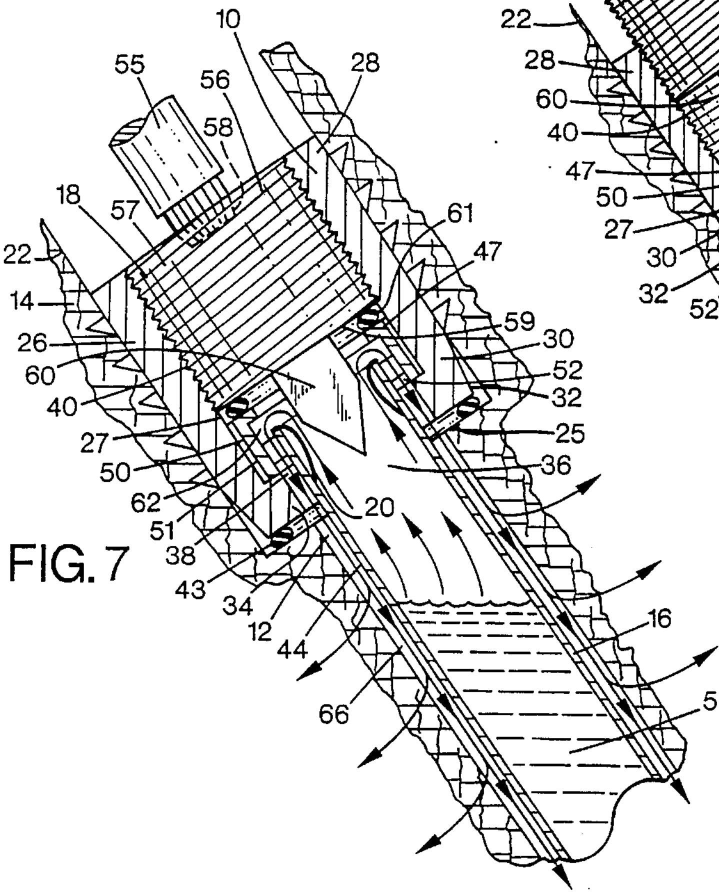
FIG. 7 is a view somewhat similar to FIG. 6 with the device in operating position.

Docking sleeve 10 is generally cylindrical and has a sidewall 26. Externally projecting barbs 24 extend outwardly from the sidewall. The sleeve has an internally threaded section 40 and a lower, non-threaded section 27 (FIGS. 6 and 7).

One end 28 of docking sleeve 10 is fully open and its opposite end 30 has an inwardly extending lip or bottom portion 34 (FIG. 4) defining a central substantially circular aperture 36. The central aperture 36 and a plurality of radially-spaced fluid passages, or notches, 38 surrounding the aperture extend longitudinally through bottom portion 34. It is to be understood that notches 38 could be of any type of passageway including grooves or holes. Docking sleeve 10 has an outside chamfered portion 32 making it easier to position and insert docking sleeve 10 into bore 12.

A plurality of radially-spaced aligning members, such as bar stops 42, extend inwardly from non-threaded sidewall section 27 toward central aperture 36, and upwardly from bottom 34. The function of bar stops 42 will be explained below.

Docking sleeve 10 can be tapped into outer end 22 of bore 12 by a mallet (not shown) so that the external barbs 24 partially penetrate the wall of the pre-drilled bore and serve to inhibit docking sleeve 10 from turning or backing out of bore 12. As is explained in detail below, an important feature of the present invention is that docking sleeve 10 is sealingly engaged with the outer end portion 22 of the bore. A sealing O-ring 43 is interposed between the bottom of the docking sleeve and bottom lip 25 of the counter-bore to ensure a fluid-tight seal between sleeve 10 and the bore. The continuous outer surface of the sidewall 26 of the docking sleeve also bears tightly against the wall of the bore to produce a substantially fluid-tight seal therebetween.

The rechargeable chemical-containing cylinder 16 has an elongated outer cylinder wall surface 44, sized to slidably pass through central aperture 36 in docking sleeve 10, an open end 46, and an oppositely disposed closed end 48. An enlarged head portion 50 of the cylinder adjacent end 46 defines a support collar, has a diameter larger than central aperture 36 of docking sleeve 10 and is sized to rest atop bottom portion 34 of the docking sleeve when cylinder 16 is inserted through central aperture 36.

Head portion 50 has an outwardly extending lower lip 49 connected to a circumferential sidewall 51 which terminates in an inwardly extending upper lip 47. Lower lip portion 49 has a plurality of radially-spaced fluid passages, or openings, 52 extending therethrough. An important feature of the present invention is that openings 52 of head portion 50 are alignable with notches 38 of docking sleeve 10 so that fluid, such as chemical vapor, can pass therethrough. An underside of head portion 50 has four stop members 53 positioned to contact bar stop 42 on docking sleeve 10 to inhibit rotation therebetween, as will be discussed in greater detail below.

Cylinder 16 contains treating materials 54 such as wood fumigants, including, but not limited to, chloropicrin, sodium methyldithiocarbamate and methylisothiocyanate. It is to be understood that cylinder 16 may contain any other type of treating material. Cylinder 16 is made of a gas impermeable material resistant to the treating materials contained therein to prevent cylinder 16 from degrading. Suitable cylinder materials include, but are not limited to, glass, aluminum or other resistant materials.

The frangible seal 20, such as a foil cover, extends across and is adhesively sealed to the outer end of the cylinder to seal the opened end 46 of cylinder 16 to contain treating materials therein. It is important that seal 20 seals cylinder 16 so that no treating materials can escape. In a preferred embodiment, seal 20 is made of a gas impermeable material that is not chemically reactive with treating fumigants.

Actuator 18 is a solid cylindrical member having an externally threaded cylindrical body portion 56 sized to screw into internally threaded portion 40 of docking sleeve 10. An outer end 57 of actuator 18 has a torx indentation 58 therein to receive a torx wrench 55 for screwing actuator 18 into docking sleeve 10 with cylinder 16 captured therein. Other suitable forms of tool-receiving sockets can also be used, such as for receiving allen wrenches, blade or phillips screwdrivers.

Actuator 18 and docking sleeve 10 are sealingly coupled together to provide a fluid-tight seal therebetween. A sealing O-ring 61 is placed inside docking sleeve 10 on top of upper lip portion 47 of container 16 to ensure a fluid-tight seal therebetween.

A piercing projection, such as a flat bladed piercing point 60, extends longitudinally from a bottom surface 59 of actuator 18. It is of sufficient length and sharpness to pierce and tear seal 20 when the actuator is screwed into docking sleeve 10.

Explaining the method for treating a work-piece according to the invention and using the device thus far described, the downwardly inclined bores 12 having counter-bored outer portions 22, are pre-drilled into utility pole 14. O-ring 43 is placed inside outer end portion 22 to rest on bottom lip 25. Docking sleeve 10 then is tapped into upper end 22 with a mallet until docking sleeve 10 is firmly seated inside bore 12 and against O-ring 43.

A pressure test then is applied to test the integrity at the work-piece surrounding the bore. A tube 64 (FIG. 2) is screwed into docking sleeve 10 and a pressure gauge 27 is connected thereto. Elevated pressure or a vacuum is provided to the bore via tube 64. This is held for a period of time and the gauge is checked to see if any leakage occurs in the work-piece to confirm its integrity to receive and hold fumigants. If leakage occurs, the bore is not used and a replacement bore is drilled.

When a bore is determined to be without leakage, a chemical-containing cylinder 16 is inserted through aperture 36 in the docking sleeve so that its end 46 is adjacent docking sleeve 10 and head portion 50 rests atop bottom 34 of docking sleeve 10. Actuator O-ring 61 is placed on upper lip portion 47. Actuator 18 then is coated with an elastomeric adhesive (not shown) and screwed into docking sleeve 10. As actuator 18 is screwed into docking sleeve 10, piercing point 60 tears seal 20 allowing chemical vapor to escape from cylinder 16. A sufficient number of threads 56 of actuator 18 engage threads 40 of docking sleeve 10 to prevent leakage of treating materials 54 prior to piercing point 60 tearing foil seal 20. Further, the rotating motion of the piercing point will urge the cylinder to rotate until its stop members 53 contact bar stops 42 to assure that notches 38 and openings 52 align to provide through passages for vapors to pass into the bore. Chemical vapors from the cylinder flow out into a chamber 62 (FIGS. 6 and 7) defined between actuator 18 and head portion 50. Actuator 18 is screwed into docking sleeve 10 until bottom surface 59 of the actuator sealingly engages O-ring 61 (FIG. 9). As seal 20 is torn (as best seen in FIG. 7), chemical vapors escape into chamber 62 (the vapor path is shown by arrows in FIG. 7). The vapor flows out through the aligned notches 38 and 52, into a void 66 defined between wall surface 44 and the inside of bore 12. Chemical vapors then penetrate the wood to provide desired chemical treatment.

Another feature of the present invention is that cylinder 16 is rechargeable. When all the chemicals have vaporized, actuator 18 may be unscrewed and the empty cylinder 16 removed for re-charging.

While the present invention has been described with reference to a preferred embodiment, it is to be understood that substitutions and alterations may be made without departing from the spirit and scope of the invention as set forth in the appended claims.

We claim:

1. A wood-treating device comprising a docking sleeve having top and bottom ends and having a continuous aperture extending through both ends;

a container for holding treating materials dimensioned to extend through the aperture and adapted to be removably mounted to the docking sleeve, the container having an elongate tubular body portion with an open end adjacent the docking sleeve and a closed end opposite the open end and having an enlarged head portion adjacent said open end extending radially outwardly from said body portion to define a support collar;

a frangible seal covering the opening; and an actuator mounted for shifting in the docking sleeve toward the seal operable to break the seal.

2. The device of claim 1, wherein the actuator comprises a piercing projection directed inwardly toward the seal.

3. The device of claim 1, wherein the container and seal are gas impermeable to contain vaporous material therein.

4. The device of claim 1, wherein the actuator and docking sleeve comprise co-acting sealing coupling means operable to provide a fluid-tight seal therebetween.

5. The device of claim 4, wherein the coupling means comprises mating threaded portions on the docking sleeve and actuator.

6. The device of claim 4, wherein the docking sleeve is adapted to be received within a bore having a surrounding wall in a work-piece, and comprises an outer portion operable to bear against and produce a substantially fluid-tight seal against the wall of the bore.

7. The device of claim 1, wherein the docking sleeve comprises a sidewall and a bottom and the aperture extends through the bottom with a lip surrounding the aperture, and the container comprises a head portion having an outwardly projecting rim dimensioned to rest against the lip to position the container.

8. The device of claim 7, wherein the lip and rim have through-passages therein permitting material from the container to pass therethrough.

9. The device of claim 8, wherein the docking sleeve and container comprise co-acting positioning members operable to position the rim and lip relative to each other to align the through-passages.

10. A container for holding materials for treating wood products comprising an elongate tubular body portion having an open end and a closed end, an enlarged head portion on said open end extending radially outwardly from said body portion to define a support collar, said collar has a first surface facing toward said closed end of the body portion and a second surface facing in the opposite direction and an opening extending through said collar from said first surface to the second surface to permit fluid to pass therethrough exteriorly of the container from said open end toward the closed end thereof, wherein said opening is spaced radially outwardly of the outer surface of said body portion, and a frangible seal extending over said open end adjacent said collar to retain treating materials in said container until said frangible seal is broken.

11. The container of claim 10, wherein the body and seal are gas impermeable to contain vaporous material therein until the seal is broken.

12. The container of claim 10, wherein said seal comprises sheet material adhesively bonded to said body portion.

13. The container of claim 10, wherein said seal is replaceable after use of the container to permit the container to be recharged with treating materials and re-used.

14. The container of claim 13, wherein said open end of the body portion has an exposed end surface to which said seal is secured permitting a broken seal to be removed therefrom and replaced with an unbroken seal upon recharging of the container for re-use.

15. The container of claim 10, which is adapted to be used in conjunction with a docking sleeve for supporting the container in a work piece the docking sleeve having a central aperture through which the container may extend and a radially inwardly extending lip surrounding the aperture with positioning elements thereon, said body portion of the container being configured to extend through said aperture with said collar resting on such lip, and said container has positioning members thereon adapted to engage the positioning elements on the lip of such docking sleeve to produce a selected relative positioning of the container and docking sleeve in use.

16. The container of claim 15, wherein said positioning members comprise lugs extending toward said closed end of the body portion from the collar.

17. A container for holding materials for treating wood products comprising an elongate tubular body portion having an open end and a closed end and an outer surface, an enlarged head portion on said open end extending radially outwardly from said body portion to define a support collar having a first surface facing toward said closed end of the body portion and a second surface facing in the opposite direction and an opening spaced radially outwardly of the outer surface of said body portion extending through said collar from said first surface to the second surface to permit fluid to pass therethrough exteriorly of the container from said open end toward the closed end thereof, and a frangible seal of gas impermeable sheet material extending over said open end adjacent said collar to retain vaporous treating materials in said container until said frangible seal is broken, said seal being removably secured to an exposed end surface of the body portion permitting a broken seal to be removed and replaced with an unbroken seal upon recharging of the container for re-use.

18. A wood-treating device comprising a docking sleeve having top and bottom ends and having an aperture extending through both ends, the docking sleeve adapted to be mounted within a bore of a work-piece;

a container for holding treating materials dimensioned to extend through the aperture and adapted to be removable from the docking sleeve while the docking sleeve is mounted within the bore of the work-piece, the container having an elongate tubular body portion with an open end adjacent the docking sleeve and a closed end opposite the open end and having an enlarged head portion adjacent said open end extending radially outwardly from said body portion to define a support collar;

a frangible seal covering the opening; and an actuator mounted for shifting in the docking sleeve toward the seal operable to break the seal.

* * * * *